United States Patent
Kohn et al.

(10) Patent No.: US 10,445,800 B2
(45) Date of Patent: Oct. 15, 2019

(54) WITNESSED AD-HOC USERVICES

(75) Inventors: Rodolfo Kohn, Cordova (AR); Claudio Ochoa, Cordova (AR); Leandro Cino, Cordova (AR)

(73) Assignee: INTEL CORPORATION, Santa Clara, CA (US)

( * ) Notice: Subject to any disclaimer, the term of this patent is extended or adjusted under 35 U.S.C. 154(b) by 618 days.

(21) Appl. No.: 13/976,505

(22) PCT Filed: Aug. 1, 2011

(86) PCT No.: PCT/US2011/046127
§ 371 (c)(1),
(2), (4) Date: Jun. 27, 2013

(87) PCT Pub. No.: WO2013/019206
PCT Pub. Date: Feb. 7, 2013

(65) Prior Publication Data
US 2013/0275311 A1    Oct. 17, 2013

(51) Int. Cl.
*G06Q 30/06* (2012.01)
*G06Q 30/08* (2012.01)
(Continued)

(52) U.S. Cl.
CPC ..... *G06Q 30/0609* (2013.01); *G06Q 30/0611* (2013.01); *G06Q 30/0613* (2013.01);
(Continued)

(58) Field of Classification Search
CPC .. G06Q 30/02; G06Q 30/0601; G06Q 50/188; H04L 12/585; H04L 51/12; G06F 17/30873; G06N 3/004
(Continued)

(56) References Cited

U.S. PATENT DOCUMENTS 6,394,341 B1    5/2002  Makipaa et al.
7,333,535 B2 *  2/2008  Redfern ............. H04L 27/2608
                                                       375/220
(Continued)

FOREIGN PATENT DOCUMENTS

CN    1313973    9/2001
CN    1608264    4/2005
(Continued)

OTHER PUBLICATIONS 2-page print out of claim terms searched on google.com, searched and printed on May 21, 2019.*
(Continued)

*Primary Examiner* — Olabode Akintola
*Assistant Examiner* — Sanjeev Malhotra
(74) *Attorney, Agent, or Firm* — Womble Bond Dickinson (US) LLP

(57) ABSTRACT

A service may be any device hardware and/or software, or portion thereof, that can be identified by a provider for sharing with or selling to a consumer device in accord with a negotiation for its sharing or selling. The consumer may be any machine capable of consuming or providing a service; artificial intelligence may facilitate the sharing/selling. A witness may: track negotiations for sharing/selling, authenticate consumers/providers, and facilitate financial payments between consumers/providers. Financial charges may be micro-charges, e.g., very low cost. A consumer/provider may have an associated reputation that may affect the negotiation, and a party may be transitory and/or in an environment risking interruption of the sharing or selling, and these characteristics may affect the negotiation. The witness may electively cover losses to the consumer/provider, particularly when the cost of the transaction is a micro-charge.

6 Claims, 5 Drawing Sheets

(51) Int. Cl.
  *H04W 12/06* (2009.01)
  *H04W 84/18* (2009.01)
(52) U.S. Cl.
  CPC ............ *G06Q 30/08* (2013.01); *H04W 12/06* (2013.01); *H04W 84/18* (2013.01)
(58) Field of Classification Search
  USPC ............... 705/6, 7.22, 35, 80; 709/206, 224; 715/760; 375/220; 380/201; 706/20, 21; 711/106
  See application file for complete search history.

(56) References Cited

U.S. PATENT DOCUMENTS

| | | | |
|---|---|---|---|
| 7,574,517 B2* | 8/2009 | Nomura | H04L 41/0856 709/224 |
| 8,448,216 B2* | 5/2013 | Liu | H04L 67/02 380/201 |
| 2001/0051885 A1* | 12/2001 | Nardulli | G06Q 10/02 705/6 |
| 2002/0038292 A1* | 3/2002 | Quelene | G06Q 20/085 705/80 |
| 2002/0065758 A1 | 5/2002 | Henley | |
| 2005/0108133 A1* | 5/2005 | Balasubramanian | G06Q 30/02 705/35 |
| 2006/0128364 A1 | 6/2006 | Costa-Requena et al. | |
| 2006/0129756 A1* | 6/2006 | De Jong | G06F 12/02 711/106 |
| 2006/0168019 A1* | 7/2006 | Levy | G06Q 20/10 709/206 |
| 2007/0112762 A1 | 5/2007 | Brubaker | |
| 2008/0027773 A1* | 1/2008 | Law | G06Q 10/06 705/80 |
| 2008/0065728 A1* | 3/2008 | Haas | G06Q 10/107 709/206 |
| 2008/0256008 A1* | 10/2008 | Kwok | G06N 3/004 706/20 |
| 2008/0300997 A1 | 12/2008 | Dawson et al. | |
| 2009/0164397 A1* | 6/2009 | Kwok | G06N 3/004 706/21 |
| 2010/0125803 A1* | 5/2010 | Johnson | G06F 16/954 715/760 |
| 2012/0116831 A1* | 5/2012 | Greenspan | G06Q 10/063 12 705/7.22 |

FOREIGN PATENT DOCUMENTS

| | | |
|---|---|---|
| CN | 101073248 | 11/2007 |
| CN | 101140648 | 3/2008 |
| EP | 1215853 | 6/2002 |
| EP | 2330847 | 6/2011 |
| TW | 200912782 | 3/2009 |
| WO | 2002/101491 | 12/2002 |
| WO | WO2006061682 | 6/2006 |

OTHER PUBLICATIONS

PCT Search Report and Written Opinion, PCT/US2011/046127, dated Apr. 6, 2012, 10 pages.
"Chen Wu et al., "AtomServ Architecture: Towards Internet-scaled Service Publish, Subscription, and Discovery," IEEE International Conference, ICEBE, Oct. 1, 2006, pp. 571-578, XP031031277, ISBN: 978-0-7695-2645-4".
"Extended European Search Report dated Feb. 25, 2015, in European Patent Application No. 11870322.2, 7 pages".
Official Letter and Search Report for Taiwanese Application No. 101127595 dated Aug. 1, 2016, 7 pages.
Article 94(3) for European Patent Application No. 11 870 322.2-1955 dated Oct. 6, 2016, 5 pages.
English Translation of a Second Office Action for Chinese Application No. 201180073919.8 dated Jan. 11, 2017, 12 pages.
English Translation of a Notice of Allowance in Taiwanese Application No. 101127595 dated Feb. 18, 2017, 1 page.
Chinese Office Action for Chinese Application No. 201180073919.8 dated May 10, 2018, 8 pages.
Taiwan Office Action for Taiwan Patent Application No. 10420632370 dated May 18, 2015, 5 pages.
Chinese Office Action for Chinese Application No. 201180073919.8 dated May 17, 2016, 11 pages.
Chinese Office Action for Chinese Application No. 201180073919.8 dated Jun. 26, 2017, 9 pages.
Schneier Bed—Schneier Bruce: "Excerpt from Chapter 2: Protocol Building Block", Jan. 1, 1994 (Jan. 1, 1994), Applied Cryptography : Protocols, Algorithms, and Source Code, John Wiley & Sons, Inc, New York, NY [U.A.], p. 26-37.
Office Action received for Taiwanese Patent Application No. 101127595, dated May 20, 2015, 5 pages of Original Document Only.
Office Action received for Chinese Patent Application No. 201180073919.8, dated Jan. 10, 2018, 29 pages (16 pages of English Translation and 13 pages of Office Action).
International Preliminary Report on Patentability and Written Opinion for PCT/US2011/046127 dated Feb. 13, 2014, 7 pages.
Office Action and Search Report for Taiwan Patent Application No. 101127595, dated Aug. 15, 2014. English Translation of Search Report provided.
Chinese Office Action for Application No. 201180073919.8 dated Aug. 5, 2019, 7 pages.

* cited by examiner

WITNESSED AD-HOC USERVICES

CROSS-REFERENCE TO RELATED APPLICATION

This patent application is a U.S. National Phase Application under 35 U.S.C. § 371 of International Application No. PCT/US2011/046127, filed Aug. 1, 2011.

FIELD OF THE INVENTION

The invention generally relates to peer to peer services, and more particularly to ad-hoc decisions of one or more devices to share a hardware and/or software service on witnessed terms of service.

BACKGROUND

Each year gives new high powered portable devices or "smart devices", such as cell phones, tablet computers, netbooks, notebooks, laptop computers, e-readers, gaming devices, and the like. Almost without fail, each successive device generation has increased features, processing power, battery life, and communication options. Devices we call a cell phone today have the processing power of high-end dedicated servers from not too many years ago. And of particular interest, society is fast approaching (and some would say we have already arrived) at a state of pervasive computing, where a substantial percentage of a population has at least one smart device capable of interacting with other people's smart devices and business devices.

While there currently exist various for-a-fee business models allowing for device sharing, such as the concept of a town phone where one party acquires a phone from a communication company and resells use of the phone to townspeople, or kiosks and storefronts providing access to, for example, telephones, photocopiers, computers, the Internet, photo printing, etc., these business models require a consumer to stop to register for services, pay a fee (e.g., by providing credit card or other charge-back data), and access as proscribed by the service vendor. And even though such an arrangement can be considered ad-hoc in the sense that a traveler may just wander into range of, say an airport kiosk and its services, the service provider is not ad hoc, and is instead a pre-established vendor with associated services with manual charge systems, such as charging to a provided credit card or other charge back data.

With the pervasive access to high powered smart devices, however, we are provided with a unique opportunity for innovative ah-hoc peer to peer interactions, e.g., structured, ad-hoc, and other types of collaborative scenarios, in cooperative networks and pervasive computing environments.

BRIEF DESCRIPTION OF THE DRAWINGS

The features and advantages of the present invention will become apparent from the following detailed description of the present invention in which.

DETAILED DESCRIPTION

Figure 1:
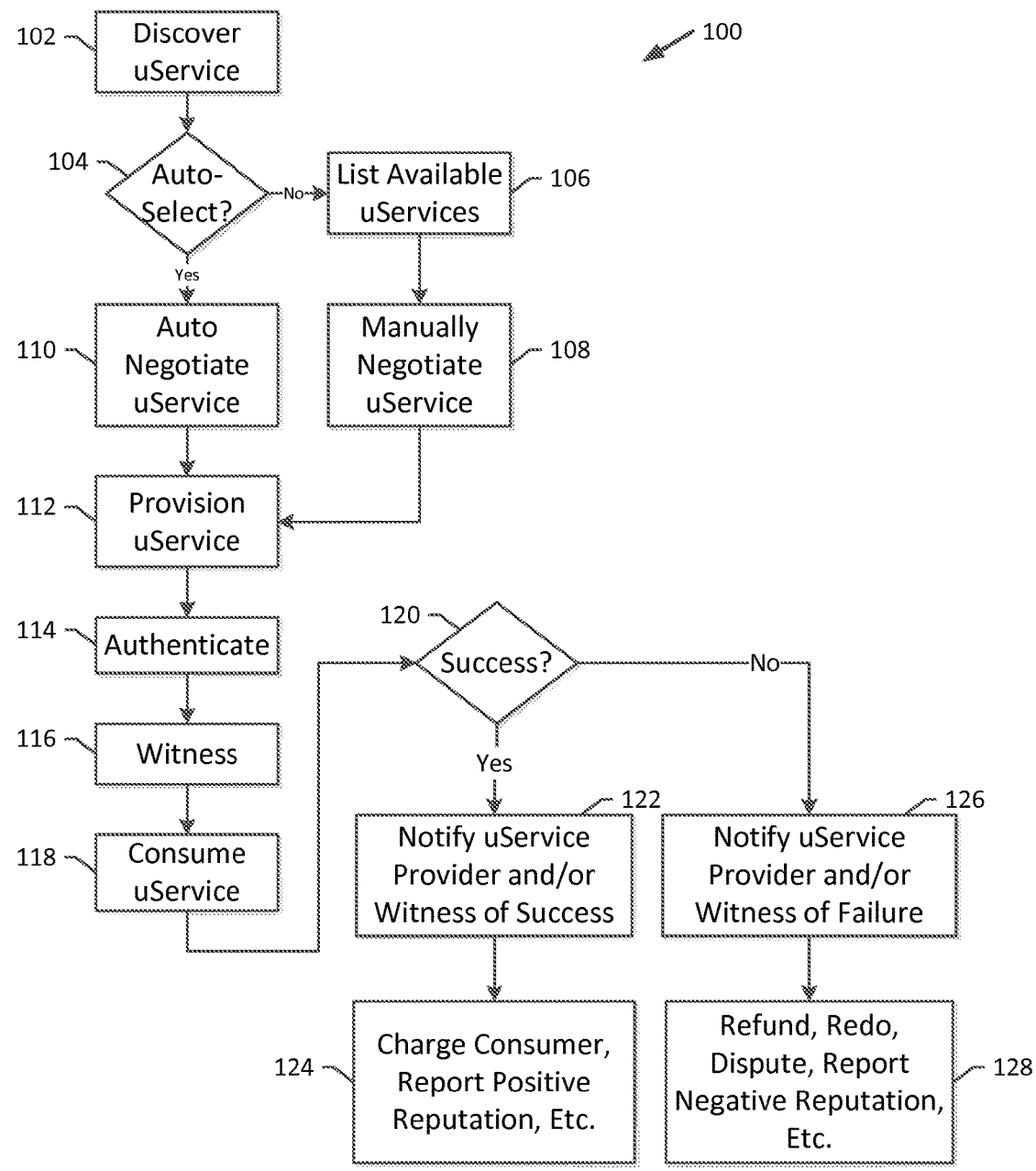
FIG. 1 illustrates a flowchart according to one embodiment for discovering and consuming a service.

In the description and claims that follow the term "service" is intended to generally reference any hardware and/or software of a device, portion thereof as well as an interface thereto (e.g., a hardware or software port, data link, Application Programming Interface (API), etc.), that can be identified and shared with another device; sharing access to or giving over right to access some resource, e.g., hardware, software, data, etc. of another device; as well as completing a purchase/sale transaction, e.g., selling physical or electronic goods. Giving over right to access, in one embodiment, refers to the sharer/service provider not retaining access to the hardware, software, data, etc. until a consumer completes consumption (akin to sharing a book, when loaned out, it is unavailable). The term "device" is intended to generally refer to any machine that is capable of consuming or providing a service to a consumer.

It will be appreciated sharing may have associated terms and/or conditions, and they can be predetermined, such as: price, expected or guaranteed Quality of Service (QoS), guaranteed or expected Time to Live (TTL) of a device, e.g., a consumer or service provider may be flagged as a transitory device because it is using a limited range wireless communication such as Bluetooth or Wi-Fi and is simply passing through a coverage range of another device. (Note that all marks referenced herein are the property of their respective owners.) It will be appreciated terms and/or conditions may be open ended, e.g., arbitrary descriptive terms or associated tags may be used by a consumer or service provider that can be evaluated by the other party for accepting/arranging service. Various embodiments may process arbitrary descriptions in different ways, such as by presenting them in a user interface (UI) for managing service acquisition, artificial intelligence (AI) analysis, community defined extensions to services, etc. For example, a special interest group (SIG), Standards Development Organization (SDO), Joint Development Organization (JDO) or other collective body may promulgate a standard defining various services, terms, conditions, pricing structure, dispute resolution policy, other policy, consumer and/or service provider device class categories, etc. in a given version, and as well as subsequent versions of a standard, where devices may identify their compliance with a particular version of the standard and thus facilitate service acquisition.

In various embodiments and the claims that follow, the term "Witness" will be used to refer to a third-party entity that is in a position to document or otherwise attest to some or all of the terms and/or conditions under which a consumer agrees to consume a service from a service provider. The Witness may also authenticate/validate the identity of devices taking part in service acquisition when and identity is not immediately available from a device and/or when the device appears to be invalid. For example, to avoid fraud, a device might be locked out until a Witness can authenticate that the device has not been compromised. In some embodiments, the Witness may process financial payments, if any, for consuming a service. In a further embodiment, the Witness may also track credits associated with a device, as well as a reputation for the device. It will be appreciated a device's reputation may be positively or negatively impacted based on interaction of the device. While it is assumed for clarity a Witness is a separate entity, the witness functions may be performed in a peer to peer fashion between two devices.

FIG. 1 illustrates a flowchart 100 according to one embodiment for discovering and consuming a service. In this embodiment, a device attempts to discover 102 a service. Discovery may be automatic 104, such as while a device is active it may be constantly looking for services that become available and matching them against a known list of desired services (not illustrated), or manual, such as by listing 106 in a User Interface (UI) available services for selection by a user.

It will be appreciated many different techniques may be used to discover 102 devices and associated services offered by the device. For example, Apple Inc.'s Bonjour; Service Location Protocol (SLP) (see, e.g., IETF (Internet Engineering Task Force) RFC (Request for Comments) 2608, 3224); Simple Service Discovery Protocol (SSDP); Microsoft Corporation's Universal Plug and Play (UPnP) technology; Sun Microsystem's Jini; Bluetooth Service Discovery Protocol (SDP); web service's UDDI (Universal Description Discovery and Integration); XML (eXtensible Markup Language) based XMPP (Extensible Messaging and Presence Protocol) Service Discovery (see, e.g., IETF RFC 3922, 3923, 6120, 6121); WS-Discovery (Web Services Dynamic Discovery); XML based XRDS (eXtensible Resource Descriptor Sequence); SIP (Session Initiation Protocol) Session Mobility, e.g., IETF RFC 5631. One skilled in the art will appreciate that techniques from some or all of these protocols and environments may be applied to implement platforms, services, and back-end communication to support for discovery and use of discovered devices and resources.

In the illustrated embodiment, a device is looking for a uService (micro-service). A uService is not really different from a service as discussed above, e.g., performing photo printing at a pharmacy or renting a computer at an airport kiosk, except conceptually as discussed herein a uService offered by a device is intended for casual ad-hoc consumption by another device, and there is an expectation that a fee associated with a service, if any, be small. The low (or free) fee is an important aspect to dispute resolution for a uService, as will be discussed in more detail below. With development of appropriate platforms and distribution channels, it will be appreciated developers may produce applications and device features or functionality to enable innovative uServices that device owners may then provide to consumers. The term "uConsumer" will be used to represent consumers that consume uServices.

It will be appreciated a uService offered by a device may be a "packaged service" or pService determined by combining one or more uServices of a device and/or uServices available to the device from other devices. The ability to share uServices and pServices can provide a revenue stream for device owners, developers, distributors and other enablers. In one embodiment, a uConsumer of a uService may offer that uService as a pService, such as when the uService is no longer needed. For example, a uConsumer of an hour of Internet access, if not interested in sharing the uService, may instead offer remaining time as a pService to a device seeking a short term connection. (See also FIG. 3.)

Whether uService selection is automatic 104 or manual 106, after selection, the uConsumer and uService Provider respectively manually 108 or automatically 110 negotiate the terms and/or conditions for the uService. In one embodiment, manual 108 negotiation allows for UI based selection between uService terms and/or conditions, such as price, performance, QoS, a promotion or a coupon associated with the uService, or a characteristic or a type associated with the uService of interest to a uConsumer etc. to be chosen when a uService Provider allows for multiple options for the uService. It will be appreciated an associated type or characteristic may be any information or meta-data that, for example, may describe, characterize, constrain the uService, Assuming satisfactory terms and/or conditions are available, then provisioning may proceed. Automatic 110 negotiation, in one embodiment, utilizes an AI, expert system, preference based decision system, or the like, where uConsumer constraints (such as a price limit), preferences, policies, or the like are known and terms and/or conditions associated with a uService are processed and mapped against the uConsumer constraints. If minimally required terms and/or conditions can be successfully mapped, then provisioning 112 may proceed. It will be appreciated provisioning a uService requires taking whatever steps are necessary to make a uService available to another device (if you are the uService Provider), and taking steps as to be able to utilize the uService if you are a uConsumer. It will be appreciated by one skilled in the art that provisioning is uService specific. For example, if the uService is providing the uConsumer with a display, access to a network, or a printer, the provisioning would respectively include providing for streaming data from the uConsumer to the display, associating the uConsumer with and granting access to the network, or providing a data path for print data and configuring the printer to accept the data to print. Further provisioning details are not presented here as they are dependent on provided uService(s).

After selecting, negotiating, and provisioning a uService, a uConsumer authenticates 114 with the uService Provider and/or a third party to arrange for receipt of a desired uService. Authentication allows the uConsumer and uService Provider to be able to rely on each other's identity. Since uConsumers and uService Providers may be transitory in some instances, such as when in an airport, a mechanism needs to be in place to reassure both uConsumer and uService Provider that each will obtain the benefit of their bargain, e.g., the uService Provider wants to be paid, and the uConsumer wants to only pay if the uService is successfully consumed. In the illustrated embodiment, a Witness witnesses 116 the transaction.

A Witness may be used to monitor a transaction's terms and/or conditions to ensure the uConsumer and uService Provider can be made whole, e.g., compensated, refunded, provided an alternate solution, etc. in the event of a problem with a transaction. In one embodiment the Witness is a stable third party entity that remains available across the lifespan of transactions notwithstanding a transitory uConsumer or uService Provider. See FIG. 2 for a detailed description according to one embodiment of authenticating 114 and witnessing 116 a transaction.

After establishing (e.g., items 102-114) a consumption arrangement, a uConsumer attempts to consume 118 the uService. If 120 consumption succeeds, in one embodiment the uConsumer notifies the uService Provider of success and post consumption operations 124 may be performed, such as charging the uConsumer. In an alternate embodiment the uConsumer may notify the Witness in addition to or in lieu of the uService Provider, and the uService Provider, if notified, may in turn notify the witness as part of closing out the consumption transaction. In one embodiment, post successful consumption, positive reputation from the uService Provider may be associated with the uConsumer, and conversely, positive reputation from the uConsumer may be associated with the uService Provider. In one embodiment the Witness tracks reputation data for uConsumers and uService Providers, however it will be appreciated that reputation data stores may be independently or otherwise maintained, see, e.g., FIG. 4 item 422 (Reputation Data).

If 120 consumption was not successful, the uConsumer notifies 126 the uService Provider of failure to consume and post failed consumption operations 128 may be performed. As with success, various notifications from the uConsumer and uService Provider may be made between each other and to the Witness. When there is a failure, the uConsumer typically will not be charged. In one embodiment, post failed consumption operations include canceling a charge, redoing the transaction, engaging in dispute resolution, reporting negative reputation data for the uConsumer, etc. Conversely, the uConsumer may also report reputation data for the uService Provider.

Regarding reputations, it will be appreciated over time a uConsumer or uService Provider may acquire significantly positive or negative reputations based at least in part on multiple interactions (e.g., uConsumer transactions). In some embodiments associated reputations are utilized at least in part on determining acceptable terms and/or conditions for a transaction. For example, a uConsumer or uService Provider with a poor reputation may be deemed unreliable, and this information used in determining rates and other characteristics of a transaction when the uConsumer is discovering 102 services. For example, a uService Provider may charge a higher rate, or charge a fee up-front, or limit data access, etc. for uConsumers having a negative reputation. Conversely, a uConsumer may refuse to pay much at all, or simply refuse any services offered by an unreliable uService Provider.

It will be appreciated that sometimes a transaction will fail due to circumstances beyond the control of the parties, such as the nature of the transaction, the location of the uConsumer (e.g., if at an airport it can be expected that the uConsumer may have to suddenly disconnect due to travel requirements), the type of uConsumer or uService Provider (e.g., a device on battery power may be expected to suddenly disappear without completing consumption), and the like. Such conditions are, in one embodiment, factored into the reputation computation. For example, little or no prejudicial impact might be attributed to a failed transaction attempted under unreliable circumstances. In one embodiment, a device's operating system and/or firmware provides for direct inspection of various device characteristics in order to allow another party to a consumption transaction to "prove" the device's unreliable circumstance.

Figure 2:
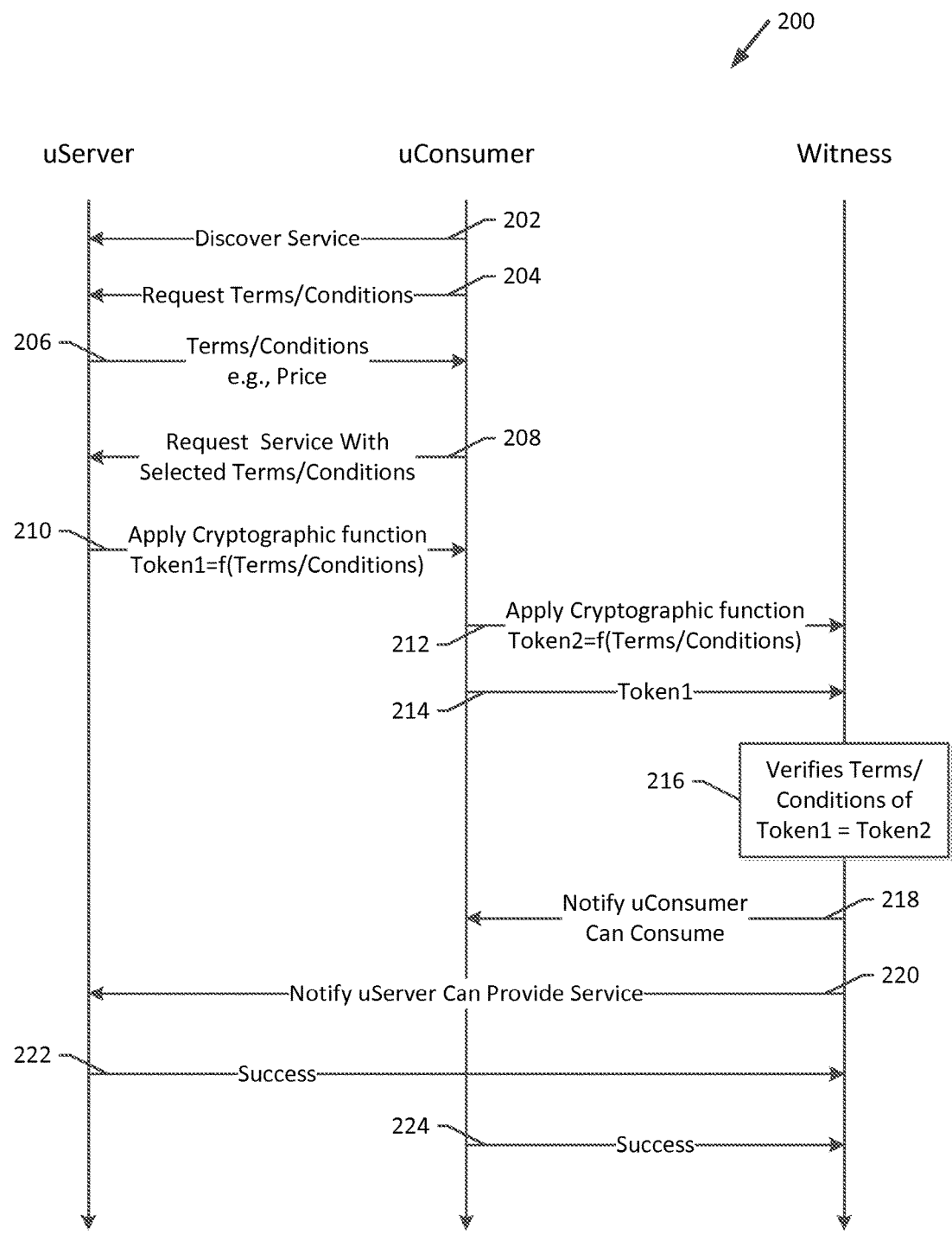
FIG. 2 illustrates, according to one embodiment, witnessing a transaction between a uConsumer and uService Provider.

FIG. 2 illustrates, according to one embodiment, witnessing a transaction between a uConsumer and uService Provider. It will be appreciated by one skilled in the art that the illustrated operations are core transactions and there be many prior, following and intervening operations not illustrated. In the illustrated embodiment, there are three entities engaged in negotiating for a uService, two peer devices including the uConsumer and uService Provider, and a Witness.

The uConsumer may be any consumer device seeking a service, the uService Provider may be any device offering the service, and the Witness, in this embodiment, may be any entity or third party capable of authenticating peer devices, authorize interactions between peer devices, arbitrate disputes, and be responsible for successful realization of payments between devices. The peer devices are assumed to have associated unique identifiers such as a GUID (Globally Unique Identifer) or near-GUID such as determined from a hash function in order to facilitate the Witness being able to track different devices, however, unique identifiers and other transaction details are not being illustrated in an effort to reduce complexity in the figure and allow attention to focus on the novel concepts presented herein.

As illustrated, a uConsumer discovers 202 (see, e.g., FIG. 1) a service of interest. As discussed above, it will be appreciated the service may be a request for use of hardware and/or software associated with the UService Provider, or it may represent an attempt to engage in a purchase/sale transaction for a good, such an eBook where purchase may result in automatic irrevocable transfer of a license to the eBook from the uService Provider to the uConsumer. The uConsumer requests 204 the terms and/or conditions for accessing the service. The uService Provider responds 206 with the terms and/or conditions, which may include, for example, price, constraints (time limit, maximum QoS, etc.), or any other condition. The uConsumer may accept or reject the service conditions automatically, such as by way of and AI, use of an expert system, or based on behavior policies, or by end-user action, e.g., by way of a GUI. It will be appreciated the uService Provider may provide multiple service alternatives and the uConsumer may picks what is most desirable, if anything, of the offered options.

Assuming the uConsumer determines acceptable terms and/or conditions, the uConsumer requests 208 the service by sending at least a request service message to the uService Provider device identifying the specific service (e.g., by service ID and attributes not illustrated) and the accepted conditions. In the background, not illustrated, it will be appreciated the uService Provider will perform some accounting to track the transaction. For example, the uService Provider may create a SessionID for the transaction that, like the device IDs, is a GUID or near-GUID. In one embodiment, the SessionID may have a limited lifetime to help minimize confusion and risk of duplicated SessionIDs. It will be appreciated the SessionID lifetime may be a function of a likely duration of uService access, and it may be structured with portions corresponding to service(s) being obtained, as that will also minimize risk of duplicate IDs.

The uService Provider then applies 210 a cryptographic function to create a Token1 based on the terms and/or conditions the uService Provider believes the uConsumer has requested, where the token is signed so as to identify the uService Provider, encrypted to restrict verification to the Witness, and sent to the uConsumer. It will be appreciated one or more different cryptographic techniques may be used and depending on the technique(s) employed, the operations description here may require modification. In one embodiment, Token1 may contain various data, such as an identifier, e.g., GUID, for the uService Provider device, an identifier of the service being provided to the uConsumer, the terms and/or conditions upon which the uService Provider has agreed to provide the service, and a SessionID. The uService Provider may then sign the token, such as by hashing it and cryptographically signing the hash with a PKC (public key cryptosystem) private key associated with the uService Provider. Token1 is then encrypted with a public key associated with the Witness. Token1 is then sent to the uConsumer, along with the session ID without encryption.

The uConsumer then applies 212 a cryptographic function to create a Token2 based on the terms and/or conditions the uConsumer believes the uService Provider has agreed to, where Token2 is signed so as to identify the uConsumer, encrypted to restrict verification to the Witness, and sent to the Witness for validation along with sending 214 Token1. In one embodiment, the uConsumer stores the Session ID for the negotiated session and Token2 contains an identifier, e.g., GUID, for the uConsumer device, an identifier of the service the uConsumer expects to receive, the terms and/or conditions upon which the uConsumer has agreed to acquire the service, and the Session ID. The uConsumer may then sign the token, such as by hashing it and cryptographically signing the hash with a PKC (public key cryptosystem) private key associated with the uConsumer. Token2 is then encrypted with a public key associated with the Witness. The uConsumer then sends both Token1 and Token2 to the Witness, requesting a third token (Token3) be created by the Witness to authorize the service.

Once the Witness receives both tokens, it verifies 216 the Terms and/or Conditions of Token1=Token2, e.g., it confirms that both the uConsumer and uService Provider are in agreement as to terms and/or conditions for the service to be provided. In one embodiment, verification may be performed by the Witness decrypting Token1 and Token2 with its private key associated with the public key used by the uConsumer and uService Provider. The Witness can then authenticate the tokens by validating the signatures of the uConsumer and uService Provider with their respective public keys. The Witness may then confirm that the service identifier, terms and/or conditions, etc. are the same in both Token1 and Token2. If so then the Witness can track the existence of the transaction (for later proof, dispute, or other business need), and authorize the transaction to proceed by notifying 218 the uConsumer it may consume on the terms and/or conditions it is expecting, and notifying 220 the uService Provider it may provide the service on the terms and/or conditions it is expecting. In one embodiment the notifying includes sending a Token3 containing the Session ID and cryptographically signed (based on the Witness' private key) data identifying the transaction detail to both the uConsumer and uService Provider. In another embodiment (not illustrated), the Witness sends Token3 to the uConsumer which verifies Witness authorization, e.g., by checking the Witness signature with the Witness' public key, and if confirmed, then the uConsumer forwards Token3 to the uService Provider for similar verification.

Once uService consumption has finished, both UConsumer and uService Provider send 222, 224 "service fulfilled" completion messages to the Witness indicating the uService was successfully delivered and consumed. Metering of uService may be executed in both uConsumer and uService Provider devices and measurements may be sent to the Witness along with or embedded within the "service fulfilled" messages. It will be appreciated the likelihood of large-scale adoption of uServices as described herein improves with use of robust business processes for revenue realization and revenue sharing among uService business model participants (e.g., device owner, service developer, enablers, aggregators, etc.). In the illustrated embodiment, uServices typically have small amounts of money, the handling of which can be managed in accord with micropayment techniques such as those by PayPal, Millicent, NetBill, cell phone base payments, and Visa's payclick, and the like.

The Witness may implement any mechanism for dispute management. It will be appreciated that since any individual transaction may represent a small cost, the Witness may elect to simply absorb a loss when something goes wrong with a transaction. It will be appreciated that such a decision may be based at least in part on the characteristics of the transaction, e.g., when one party is known to be transitory and may be forced to fail, or on the reputations of the uConsumer and uService Provider. For example, if both have good reputations, the Witness may conclude that the parties did honestly attempt the transaction and rather than waste resources engaging in a dispute, the Witness may just approve the payment of the uService Provider. The Witness is assumed to take a small percentage of the transactions it witnesses and the associated cost charged by the Witness may be based at least in part on an expected, e.g., statistical, failure rate of transactions. However, if any party is known to have a bad reputation, the Witness may only compensate one party, e.g., pay a good uService Provider but require a dispute proceeding with a uConsumer with a poor reputation, or refund a good uConsumer but require a dispute with a uService Provider with a poor reputation, or require all parties to engage in a dispute process. It will be appreciated the uConsumer and uService Provider may have their own dispute processes as well.

Figure 3:
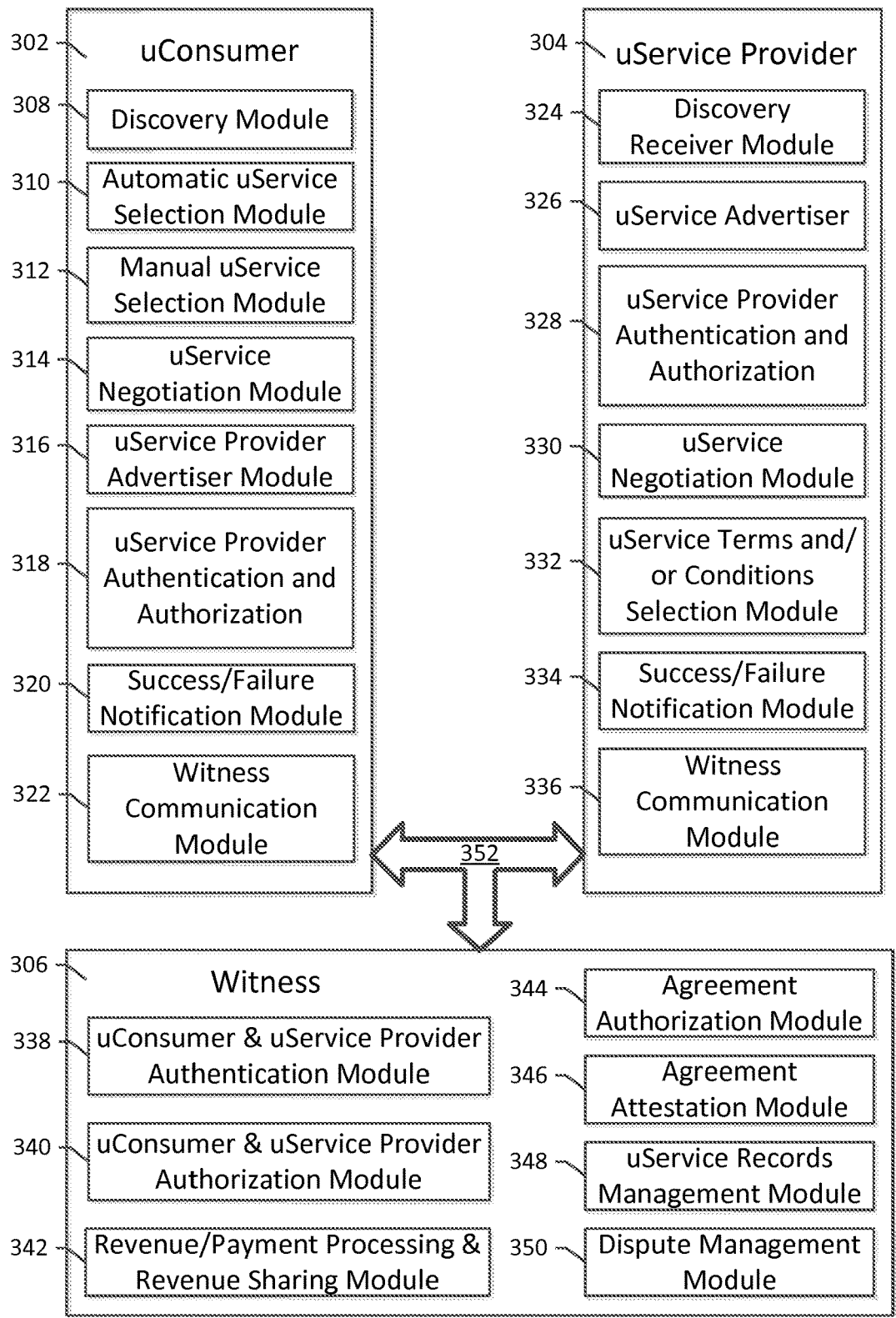
FIG. 3 illustrates exemplary uConsumer, uService Provider and Witness platforms according to one embodiment.

FIG. 3 illustrates exemplary uConsumer 302, uService Provider 304 and Witness 306 platforms according to one embodiment, and functional modules 308-350 that represent hardware and/or software functionality required to implement some or all of the various processes discussed with respect to the illustrated and claimed embodiments.

The exemplary uConsumer platform in a device implementing uServices includes a discovery module 308 which may be used to locate services offered by uService Providers. A uConsumer may also include an automatic uService selection module 310 to enable the uConsumer device to automatically navigate and select from various service options, or (perhaps in lieu of automatic service selection) a manual uService selection module 312 for presenting an end-user with service options, e.g., by way of a GUI. It will be appreciated automated selection can be based on various factors and preferences, including system-provided and/or consumer-set policies or preferences for choosing one provider over another, or selecting one uService over another. The uConsumer also includes a uService negotiation module 314 for engaging in the back and forth, as required, messaging between uConsumer and uService Provider to establish agreed upon transaction terms and/or conditions.

Because, as discussed above, a uConsumer may resell consumed services, or otherwise offer its own service, it has components of a uService Provider, such as an advertiser module 316 to offer its services. In addition the illustrated embodiment includes a uService Provider authentication and authorization module 318, possibly using a backend system to offload local processing requirements, and a success/failure notification module 320 to allow indicating whether consumption worked, and in some embodiments, trigger a dispute and/or resolution process if failure is reported. The uConsumer may also include a Witness communication module 322, which will allow at least communicating with a Witness to receive confirmation the uConsumer may consume a desired service on expected terms and/or conditions. It will be appreciated that a uConsumer may contain many more modules for other features/operational characteristics, including those of a uService Provider not illustrated here.

The exemplary uService Provider 304 platform in a device implementing uService Provider includes a discovery receiver module 324 to handle discovery requests from uConsumers, a uService advertiser 326 to advertise services available from the uService Provider, or, as discussed above, available to the uService Provider from a third party and that may be provided to a uConsumer individually or grouped with one or more other services of the uService Provider. It will be appreciated the uService advertiser 326 functionality may be provided by a third-party device, such as a uServer Directory (see, e.g., FIG. 4 item 422) configured to advertise the uService and other pertinent information regarding the uService Provider, such as its location to facilitate a uConsumer seeking local or nearby services. As with the uConsumer, the uService Provider contains an authentication and authorization module 328 for engaging in secured (e.g., encrypted) and/or verifiable (e.g., by way of cryptographic signatures or the like) communication with a uConsumer, Witness or other entity or device. As with the uConsumer, some of the cryptographic operations may be offloaded to a backend system to reduce local processing requirements. There may also be negotiation 330 and terms and/or conditions selection 332 modules to allow the uService Provider to respond to restrictions/constraints requested by a uConsumer, such as price limits, QoS guarantees, etc.

As illustrated there may also be a success/failure notification module 334 to allow indicating or receiving indication whether consumption appears to have worked, e.g., successfully distributed to the uConsumer. It will be appreciate that a uService Provider may be engaging in side-channel (with respect to service delivery) status or other communication with a uConsumer and may be able to determine the uConsumer is unable to correctly consume the negotiated service. In one embodiment, this may result in the uService Provider offering (not illustrated) alternate terms and/or conditions for the service, such as providing a lower quality version of a service perhaps at a lesser cost. It will be appreciated such re-negotiation may be dynamically performed responsive to communication conditions between the uConsumer and the uService Provider. It will also be appreciated failure may trigger a dispute and/or resolution process. The uService Provider may also include a Witness communication module 336 to allow at least communicating with a Witness to receive confirmation the uService Provider may provide a desired service on expected terms and/or conditions. It will be appreciated that a uService Provider may contain other modules for features or operational characteristics.

The exemplary Witness 306 platform in a device implementing a backend platform may include a variety of modules. For example it may include a uConsumer & uService Provider authentication module 338 for communicating with corresponding uConsumer and uService Provider modules 318, 328 and a uConsumer & uService Provider authorization module 340 for communicating authorization to provide the service to the uConsumer and to the uConsumer to receive it; in the illustrated embodiment, such authorization is a functionality performed within the Witness communication modules 322, 336. There may also be a module 342 for handling revenue, payment processing and revenue sharing. It will be appreciated robust revenue management will facilitate broad adoption of described and recited embodiments. In some embodiments, revenue is managed within the Witness, but in other embodiments, such handling may be outsourced to one or more third parties, e.g., credit card verification and processing may be offloaded to a credit card company.

In the illustrated embodiment there is also an agreement authorization module 344 that works along with an agreement attestation module 346 that are utilized, for example, by the authentication module 338 to engage in cryptographically secured and attested (e.g., signed) communication between the Witness, uConsumer, uService Provider, and other entities or devices as needed. It will be appreciated the authorization and attestation modules 344, 346 could be presented as a component of the authentication module 338 but they are shown separately since they may be used for other operations and/or secure communication in addition to uConsumer or uService Provider authentication.

In the illustrated embodiment, there is also a uService records management module 348 that may be used to record the existence, state, history, etc. of a transaction, information about the uConsumer, uService Provider or other entities or devices associated with a transaction, reputation information, or the like. At a minimum in this illustrated embodiment, records management will store the identity of the uConsumer and uService Provider, a session ID if needed, and the terms and/or conditions for the service transaction. There may also be a dispute management module 350 which, as discussed above, may be used if notice is received (e.g., from modules 320, 334) consumption failed. As discussed previously, there are a variety of possible resolutions, including the Witness absorbing the loss and selectively compensating the uConsumer (e.g., appears to receive an instant refund) and/or uService Provider based on circumstance, e.g., type or location of transaction, environmental concerns, reputation of the parties, agreed upon service cost, etc. Also illustrated is a communication cross-bar 352 to indicate that the uConsumer, uService Provider and Witness may intercommunicate, e.g., by way of modules 308-350, as necessary as described above.

Thus, in the context of the FIG. 3 exemplary uConsumer 302, uService Provider 304 and Witness 306 platforms, after the uConsumer discovers a uService of the uService Provider, the uService Provider may be authenticated or verified as a valid provider using the Witness; it will be appreciated verification may be by way of a peer to peer method (not illustrated). The uConsumer may select a uService based at least in part on advertised uService attributes, and interest(s) of the uConsumer, such as maximum price to pay, QoS or bandwidth required, etc. The uConsumer may choose to check the uService Provider reputation (see, e.g., FIG. 4 items 426, 428 reputation discussion) before requesting its uService. The uService Provider may choose to authenticate the uConsumer and/or verify it as a valid consumer either using the Witness (or by a peer to peer method), and choose to check the uConsumer reputation.

A negotiation and agreement protocol such as those discussed above with respect to FIGS. 1, 2 may be executed between uConsumer and uService Provider, in a cryptographically secured manner, until terms and/or conditions are mutually agreed upon by all parties to the uService transaction; it will be appreciated there may be multiple uConsumers and uService Providers, however to simplify discussion, just one of each are illustrated. In the illustrated embodiment, a web services transaction agreement is used to track the transaction; see, e.g., Web Services Agreement Specification (WS-Agreement), Grid Forum Document GFD.107 (Open Grid Forum, 2007). It will be appreciated the WS-Agreement structure may be used explicitly or implicitly in implementing other illustrated embodiments and/or recited embodiments.

After the uConsumer completes uService consumption, appropriate service records may be sent to the Witness by the uConsumer and/or the uService Provider, and accounts updated correspondingly and payment and revenue sharing processes triggered depending, for example, on the type of account the uConsumer has. It will be appreciated the uConsumer may have many different account types that will affect revenue processing. Examples include post-service billing; pre-paid, e.g., a uConsumer credit balance may be checked prior to the Witness 306 authorizing delivery of the uService; pay-as-you-go with a credit card or other mechanism; etc.

Figure 4:
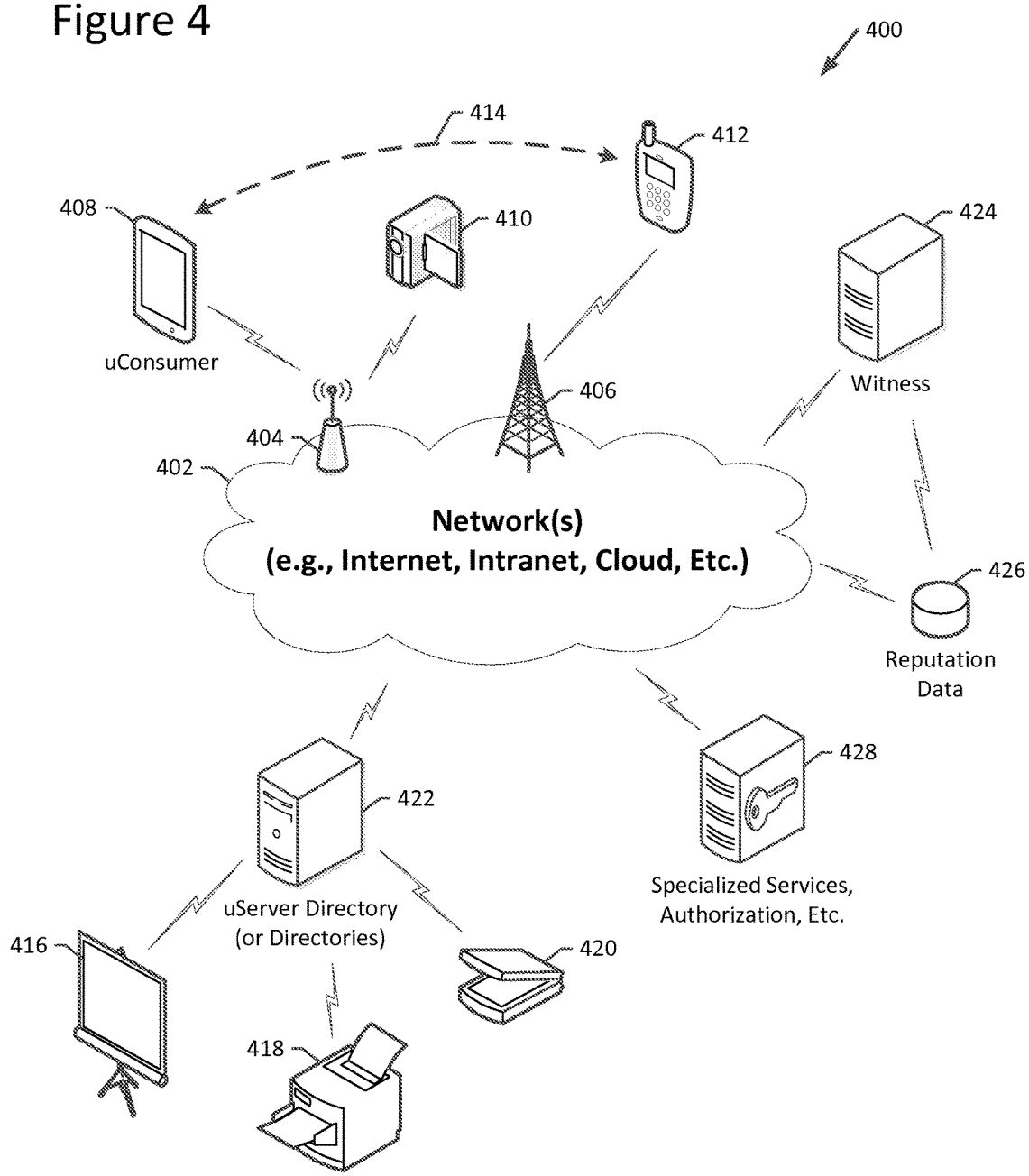
FIG. 4 illustrates a suitable computing environment in which certain aspects of the invention may be implemented.

FIG. 4 illustrates a system 400 interconnected by way of one or more network 402 and communicative couplings such as wireless transceivers which as illustrated may be a wireless access point 404 (e.g., in an environment, not illustrated, such as a home, office, storefront, etc. communicatively coupled to network 402) or a radio tower 406 such as a cellular telephone tower.

It will be appreciated any network 402 may be used, including a distributed network or cloud computing environment. The system also includes a variety of devices which may operate as uConsumer devices, such as a tablet computer 408 (or other laptop, netbook or otherwise portable computer not illustrated), a video recording device 410, or a smart device 412 such as a cellular telephone. Although it is assumed devices 408-412 will communicate through network 402, it will be appreciated devices may communicate directly, such as with a point to point connection 414, such as a wireless ad hoc link or other connection. In the illustrated embodiment, uConsumer devices 480-412 may communicate with a variety of uService Providers such as a display device 416, a printer 418 or scanner 420. In the illustrated embodiment, there may be a uServer Directory 422 to facilitate locating uService Providers 416-420, and while it is illustrated that uService Providers 416-420 are directly communicating with the uServer Directory 422, it will be appreciated they may instead be communicatively coupled by way of network 402 or direct links, e.g., link 414.

It will be appreciated uService Providers 416-420 are exemplary devices and services, and that any device feature or characteristic that can be abstracted for sharing can be shared as a service to another device, such as processing power (e.g., loaning processor cycles, or an entire core in a multiple core processor), GPS (Global Positioning System) or other sensor data, specialized input (e.g., data from a special link between a device and other resource, such as a surveillance camera) and/or output abilities (e.g., a display), Internet connection, banking, or any other hardware or software.

One exemplary usage scenario is an access point 404 offering Internet access as a uService for a specific price at a specific QoS; any uConsumer device, e.g., devices 408, 410 may request the uService's terms and/or conditions, accept them, and pay the uService Provider access point. The uConsumer may in turn offer its own service to share this Internet connection to defray its costs (perhaps at a performance hit), or simply sell a remainder of the service after consuming what it needed.

Another usage scenario is a guest having a smart device with audio/video content (e.g., from a video service, game, movie, etc.), where the smart device pays a small fee and uses Intel WI-DI, WirelessHD, Wireless Gigabit Alliance (WiGig), Wireless Home Digital Interface (WHDI), etc to access a display service and presents the audio/video content. For example, a uConsumer "on the go", such as a mobile tablet 408, may be receiving a video stream. The tablet may be configured to look for alternative display options, and hence discover display device 416 is advertising that it is available for use. The uConsumer tablet may negotiate terms and/or conditions for using the display device 416. A Witness 424 may be engaged to authenticate and track the uService transaction, and depending on the embodiment, manage the accounting relating to charging the uConsumer tablet 408 for receiving the uService, paying the uService Provider screen 416 for providing the uService, and typically, keeping a portion of the uConsumer charge as a Witness fee.

Also illustrated is a Reputation Data store 426. While some embodiments herein contemplate the Witness tracking reputation data, it will be appreciated that back-end tracking and process of uService transactions may be distributed across the network 402. Towards this end, the Reputation Data store 426 may be used to separately record reputations of uConsumers and uService Providers. In addition, such a separation may facilitate maintaining privacy.

Figure 5:
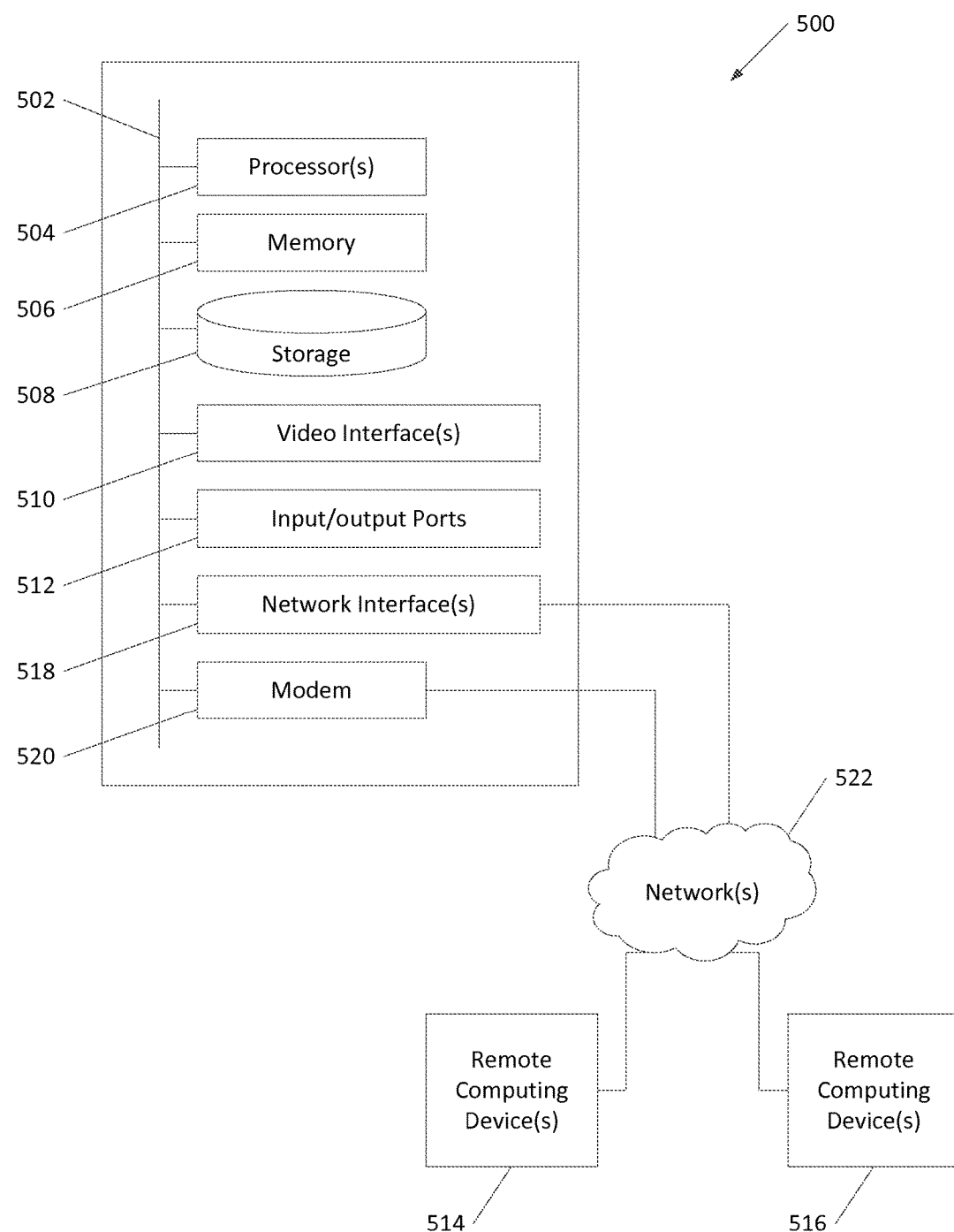
FIG. 5 illustrates a suitable environment in which certain aspects of the illustrated invention may be implemented.

FIG. 5 and the following discussion are intended to provide a brief, general description of a suitable environment in which certain aspects of the illustrated invention may be implemented. As used herein below, the term "machine" is intended to broadly encompass a single machine, or a system of communicatively coupled machines or devices operating together. Exemplary machines include computing devices such as personal computers, workstations, servers, portable computers, handheld devices, e.g., Personal Digital Assistant (PDA), telephone, tablets, smart devices, etc., as well as transportation devices, such as private or public transportation, e.g., automobiles, trains, cabs, etc.

Typically, the environment includes a machine 500 that includes a system bus 502 to which is attached processor(s) 504, a memory 506, e.g., random access memory (RAM), read-only memory (ROM), or other state preserving medium, storage devices 508, a video interface 510, and input/output interface ports 512. It will be appreciated the processor(s) may be the same or different, e.g., different ones used in different circumstance, such as power connectivity, power level state, or other state, and a processor may have multiple same or different cores. The machine may be controlled, at least in part, by input from conventional input devices, such as keyboards, mice, etc., as well as by directives received from another machine, interaction with a virtual reality (VR) environment, biometric feedback, or other input source or signal.

The machine may include embedded controllers, such as programmable or non-programmable logic devices or arrays, Application Specific Integrated Circuits, embedded computers, smart cards, and the like. The machine may utilize one or more connections to one or more remote machines 514, 516, such as through a network interface 518, modem 520, or other communicative coupling. Machines may be interconnected by way of a physical and/or logical network 522, such as the FIG. 4 network 402, an intranet, the Internet, local area networks, and wide area networks. One skilled in the art will appreciate that communication with network 522 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data such as functions, procedures, data structures, application programs, etc. which when accessed by a machine results in the machine performing tasks or defining abstract data types or low-level hardware contexts. Associated data may be stored in, for example, volatile and/or non-volatile memory 506, or in storage devices 508 and/or associated storage media, including conventional hard-drives, floppy-disks, optical storage, tapes, flash memory, memory sticks, digital video disks, etc., as well as more exotic mediums such as machine-accessible biological state preserving storage. Associated data may be delivered over transmission environments, including network 522, in the form of packets, serial data, parallel data, propagated signals, etc., and may be used in a compressed or encrypted format. Associated data may be used in a distributed environment, and stored locally and/or remotely for access by single or multi-processor machines. Associated data may be used by or in conjunction with embedded controllers; hence in the claims that follow, the term "logic" is intended to refer generally to possible combinations of associated data and/or embedded controllers.

Thus, for example, with respect to the illustrated embodiments, assuming machine 500 embodies the FIG. 4 tablet 408, then remote machines 514, 516 may respectively be the FIG. 4 uService Provider display 416 and Witness 424. It will be appreciated that remote machines 514, 516 may be configured like machine 500, and therefore include many or all of the elements discussed for machine.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A computer-implemented method performed at a witness device in communication with a uConsumer device and a uService Provider device, the witness device having a processor coupled to a memory to witness a transaction for a uService negotiated between at least the uConsumer device and the uService Provider device, the computer-implemented method comprising:
    receiving using the processor an election of the witness device to witness on-demand the transaction between the uConsumer device and the uService Provider device for a uService, the uService providing to the uConsumer device a right to consume a resource provided by the uService Provider device until consumption of the resource is complete;
    receiving using the processor a plurality of encoded representations of the transaction comprising a first encoded representation including a first term upon which the uService Provider device has agreed to provide the uService and a second encoded representation including a second term upon which the uConsumer device has agreed to acquire the uService, the plurality of encoded representations securing the transaction in accordance with a negotiation and agreement protocol executed between the uConsumer device and the uService Provider device until terms describing the transaction for the uService are mutually agreed upon by all parties to the transaction for the uService, wherein the first encoded representation is a first token that is cryptographically signed using a private key associated with the uService Provider device and then encrypted with a public key associated with the witness device, and wherein the second encoded representation is a second token that is cryptographically signed using a private key associated with the uConsumer device and then encrypted with the public key associated with the witness device;
    determining using the processor the first term by decrypting the first token and determining by the processor the second term by decrypting the second token, wherein the first token and the second token are decrypted by the processor using a private key of the witness device;
    authenticating using the processor the identity of the uConsumer device and the uService Provider device with which the witness device is in communication;
    comparing using the processor the first term and the second term to confirm that the first term and the second term are mutually agreed upon by all parties to the transaction for the uService;
    generating using the processor a third token that is cryptographically signed using the private key of the witness device to send to the authenticated uService Provider device to grant the authenticated uConsumer device the right to consume the resource provided by the uService Provider device until the uConsumer's device consumption of the resource is complete based at least in part on the comparing, wherein the first token, the second token, and the third token are configured to provide a secure communication between the uConsumer device, the uService Provider device, and the witness device for the uConsumer device to receive a desired service provided by the uService Provider device on mutually agreed upon terms determined by the witness device via the secure communication.

2. The computer-implemented method of claim 1, wherein the first encoded representation including the first term is cryptographically encoded by the uConsumer device, and the second encoded representation including the second term is cryptographically encoded by the uService Provider device, wherein to confirm that the terms are mutually agreed upon by all parties to the transaction for the uService is to determine that the first term and second term are the same terms.

3. The computer-implemented method of claim 1, further comprising:
    charging using the processor an account associated with the uConsumer device a first fee for a consumption of the uService based on the service completion messages including measurements of metered consumption of the uService;
    crediting using the processor an account associated with the uService Provider device a second fee for providing the uService based on the service completion messages including measurements of metered delivery of the uService;
    determining using the processor a failure of any one of the delivery and the consumption of the uService; and
    upon determining using the processor the failure, comparing using the processor selected ones of the first and second fee to a threshold, and based at least in part on the comparing, refunding using the processor the first fee to the account associated with the uConsumer device while leaving the second fee with the uService Provider device.

4. The computer-implemented method of claim 1, further comprising determining using the processor a reputation for at least one of the uConsumer device and the uService Provider device, the reputation determined at least in part based on whether prior witnessed transactions of at least one of the uConsumer device and the uService Provider device were completed successfully.

5. The computer-implemented method of claim 1, further comprising offloading using the processor to an external party a decoding of the first encoded representation of the transaction.

6. The computer-implemented method of claim 1, further comprising monitoring using the processor a metered delivery and consumption of the resource, including receiving service completion messages from any one of the uConsumer device and uService Provider device indicating a success or failure of any one of a delivery and a consumption of the uService device, the service completion messages including measurements of metered delivery and consumption of the uService provided by any one of the uConsumer device and uService Provider device.

\* \* \* \* \*